US009004398B2

(12) United States Patent
 Walter

(10) Patent No.: US 9,004,398 B2
(45) Date of Patent: Apr. 14, 2015

(54) BALLOON WITH DEFLATION AND MANEUVERING PORT

(71) Applicant: Forrest L. Walter, Spokane Valley, WA (US)

(72) Inventor: Forrest L. Walter, Spokane Valley, WA (US)

(73) Assignee: Forrest L. Walter, Spokane Valley, WA (US)

( * ) Notice: Subject to any disclaimer, the term of this patent is extended or adjusted under 35 U.S.C. 154(b) by 48 days.

(21) Appl. No.: 13/744,764

(22) Filed: Jan. 18, 2013

(65) Prior Publication Data

US 2014/0203135 A1    Jul. 24, 2014

(51) Int. Cl.
 *B64B 1/64* (2006.01)
 *B64B 1/62* (2006.01)
(52) U.S. Cl.
 CPC .... *B64B 1/64* (2013.01); *B64B 1/62* (2013.01)

(58) Field of Classification Search
 USPC ...................... 244/31, 32; 137/223
 See application file for complete search history.

(56) References Cited

U.S. PATENT DOCUMENTS

| 4,651,956 A   | * | 3/1987  | Winker et al. ............... 244/99 |
| 4,836,471 A   | * | 6/1989  | Piccard ..................... 244/99 |
| 2005/0224639 A1 | * | 10/2005 | Kavanagh ................. 244/31 |

FOREIGN PATENT DOCUMENTS

GB         2260956      *   5/1993

\* cited by examiner

*Primary Examiner* — Rob Swiatek
*Assistant Examiner* — Magdalena Topolski

(57) ABSTRACT

A hot air balloon with an adjustable deflation port at its upper end which can be selectively opened and closed on the ground and during flight. The positive control of the port by the operator of the balloon in the basket allows the deflation port to be adjusted at any position from full open to fully closed or held in intermediate positions as desired.

13 Claims, 9 Drawing Sheets

BALLOON WITH DEFLATION AND MANEUVERING PORT

BACKGROUND OF THE INVENTION

1. Field of the Invention

This invention relates in general to hot air balloons. The invention in particular relates to an improved venting process for the hot air used to control vertical ascent, descents and deflation of hot air balloons.

2. Description of the Prior Art

As hot air balloons have become more and more popular, they have been constructed with heaters beneath their lower opening so as to heat the air within the balloon envelope. It is necessary and desirable when the balloon lands to rapidly deflate the balloon so that the envelope will collapse, thus preventing it from being blown across the ground by the wind. It is also desirable to have a maneuvering vent for performing both vertical ascents and descents of the craft while in the air.

Prior art deflation ports provided openings which releases hot air from the top of the balloon envelope to deflate and/or maneuver the balloon vertically. Such deflation port systems which are used more than all others are called the "parachute" deflation port and vent systems. The parachute deflation port design consists of a circular opening located at the top or apes of the balloon envelope. In the deflation port opening are a plurality of load tapes which extend from the envelope gores over the center of the deflation port opening. A parachute is a circular piece of material which is made from the same fabric as the balloon envelope. The parachute is larger in diameter than the deflation port opening. The parachute is held in the envelope by a plurality of centering lines which are attached about the outer edge of the parachute. The opposite ends of the plurality of centering lines are attached to the envelope gore seams. When the balloon is inflated, with air, the internal air pressure pushes the parachute against the apex webbing so that the parachute seals the envelope about the edges of the deflation port opening. The parachute also has a plurality of shroud lines that are attached about the outer edges of the parachute at the same locations as the plurality of centering lines. The shroud lines do not attach to the balloon envelope. They extend down inside the envelope meeting directly below the parachute, where they are joined together and a pulley is attached to the shroud lines. A parachute deflation line has one end attached to an inside gore seam near the bottom of the balloon envelope and passes through the pulley. The other end of the deflation line extends downward passing through a second pulley. This is attached to the balloon envelope at a location which is opposite to the location of the deflation line termination point. The deflation line passes through the pulley and then extends down the balloon envelope and to the basket.

In operation, when the balloon is inflated, the internal pressure inside of the envelope pushes the parachute fabric against the apex webbing, thus sealing the deflation port opening. To release air for venting and/or deflation purposes the pilot in the basket pulls down on the deflation line, which pulls the deflation valve down and away from the apex webbing thus allowing air to escape the envelope. When the pilot releases the deflation port line, the internal pressure inside the envelope pushes the parachute up resealing the deflation port. Thus vertical control of the balloon in flight is accomplished. To terminate the flight, the pilot pulls down on the deflation port line holding it until the envelope deflates.

SUMMARY OF THE INVENTION

The present invention relates to a hot air balloon having a deflation port that can also be used as a maneuvering vent. That can be selectively opened or closed and adjusted to varying positions from the basket of the balloon while in flight, as well as, when the balloon is on the ground. The deflation port comprises a circular deflation valve with its center point attached to the center of the apex webbing at the deflation port opening. The deflation valve has two pluralities of shroud lines. The first plurality of shroud lines control the deflating and venting of the balloon. The second plurality of shroud lines reseal the deflation valve once its open. The deflation shroud's plurality of shroud lines are attached to the outer edge of the deflation valve and extend to a shroud load assembly located below the center of the deflation valve. The deflation lines go through a plurality of pulleys mounted on the shroud load assembly and are then connected together.

The plurality of resealing shroud lines are attached to the outer edges of deflation valve. Each pass through another plurality of pulleys which are located on the inside envelope gore seams a short distance from the deflation port opening. The resealing lines then pass down into the envelope and are connected together at a distance below the plurality of deflation shroud line. A deflation line is attached to the plurality of deflation shroud lines and extends down to the basket. A reseal control line is attached to the plurality of reseal shroud lines and extend down to the basket. When the pilot pulls the deflation control line, the deflation valve's outer edges are pulled inwardly and down away from the deflation port edge which allows air to escape from the envelope. To close the deflation valve, the pilot releases the deflation control line and pulls down on the reseal control line which pulls the outer edges of the deflation valve up and back into the deflation port opening. The internal air pressure in the envelope pushes the deflation valve against the apex webbing. Thus resealing the deflation valve back into the deflation port opening. This invention allows for venting by peeling back the outside edges of the deflation valve moving it away from the apex webbing and down from the deflation port opening. This "peel back" action has three advantages to this invention over present design: 1) the ease of operation. The deflation valve is pulled inward and down from the apex webbing and deflation port. The amount of force required to activate the deflation line is substantially less than a free floating parachute design. 2) By peeling back and pulling the deflation valve inward and down, the air exits from the envelope faster than in prior art because the air does not have to travel around a parachute. 3) By looking up into the envelope while venting the pilot can see the size of the vent opening and can better determine the vent times for maneuvers.

DESCRIPTION OF THE PREFERRED EMBODIMENTS

Figure 1:
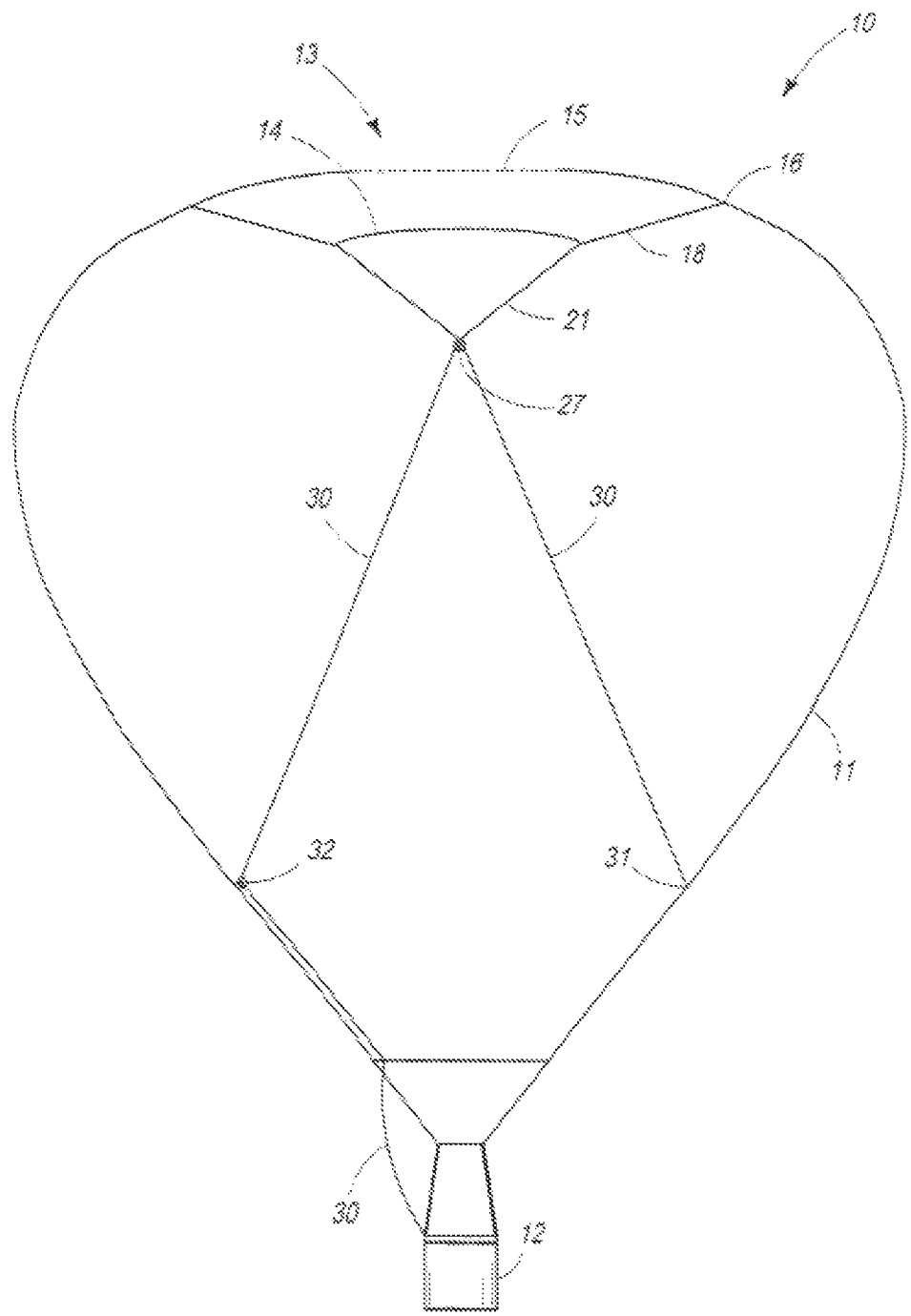
FIG. 1 is a schematic cross-section view of a typical hot air balloon including a standard parachute vent. The parachute is shown in the open or deflating position.

FIG. 1 shows the prior art parachute vent deflation port system.

A hot air balloon 10 consisting of an envelope 11 comprising a plurality of gores and has a deflation port 13 at the upper end and a basket 12 at the lower end where the pilot or operator rides. The deflation port 13 is opened and closed by means of a circular parachute valve 14 located beneath the apex webbing 15 which is located in the deflation port opening. Centering lines 18 keep the parachute 14 positioned under the apex webbing 15 and allow a range of movement of the valve from pressing up against the apex webbing to dropping directly down in the envelope 11. By opening the deflation port the parachute 14 allows the air from inside the envelope 11 to escape around the parachute 14 and out the deflation port opening. The centering lines 18 have fixed ends attached about the parachute's outer edges, their other ends are attached to the envelope's gore seams 16 about the opening and a substantial distance from the opening. The shroud lines 21 descend downward from the outer edges of the parachute 14 and are connected to a pulley assembly 27 located directly below the center of the parachute 14. The parachute deflation line 30 passes through a pulley of assembly 27 and one end of the line is attached to the envelope bridle assembly 31 and other end passes through a bridle pulley assembly 32 which is located on the other side of the inner envelope. To operate the deflation system, the pilot or operator pulls downwardly on the deflation line 30 which in turn pulls down on the plurality of shroud lines 21 which pulls the parachute 14 away from the apex webbing 15 and allows air to escape round the parachute's outer edge to exit the envelope through the deflation port opening 13. The pilot uses a pull on the deflation line 30 to vent air from the envelope. To close or reseal the parachute 14 the pilot releases the deflation line 30 and the internal air pressure pushes the parachute 14 up against the apex webbing 15 sealing it back into the deflation port opening. If the pilot wants to terminate the flight, a hard hand over hand pull is required with the pilot holding onto the deflation line 30 until the envelope is deflated.

FIGS. 2 through 9 shows preferred embodiments of the invention.

Figure 2:
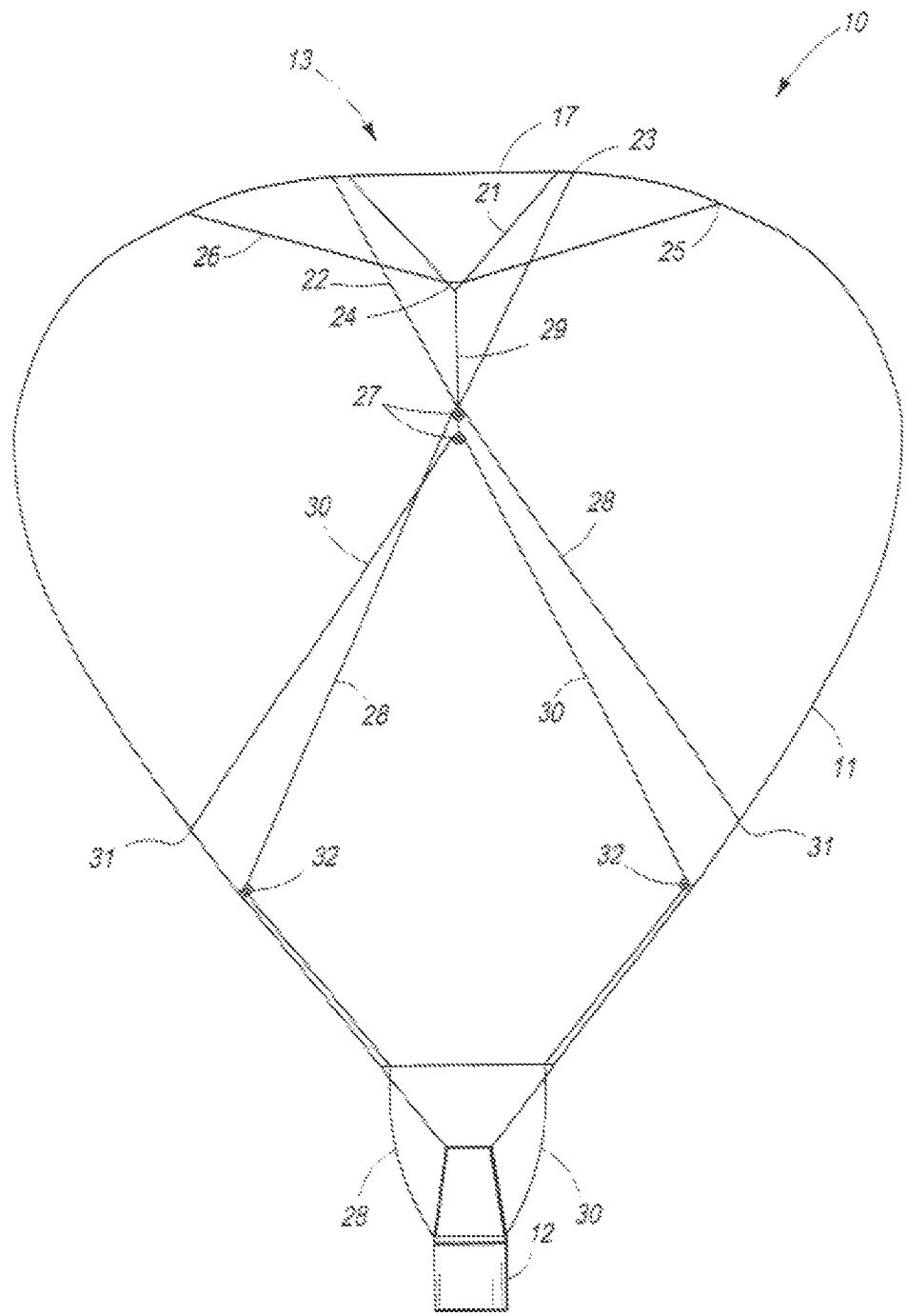
FIG. 2 is a cross-section view of the hot air balloon envelope incorporating the venting design of the present invention with the vent in the closed position.
Figure 3:
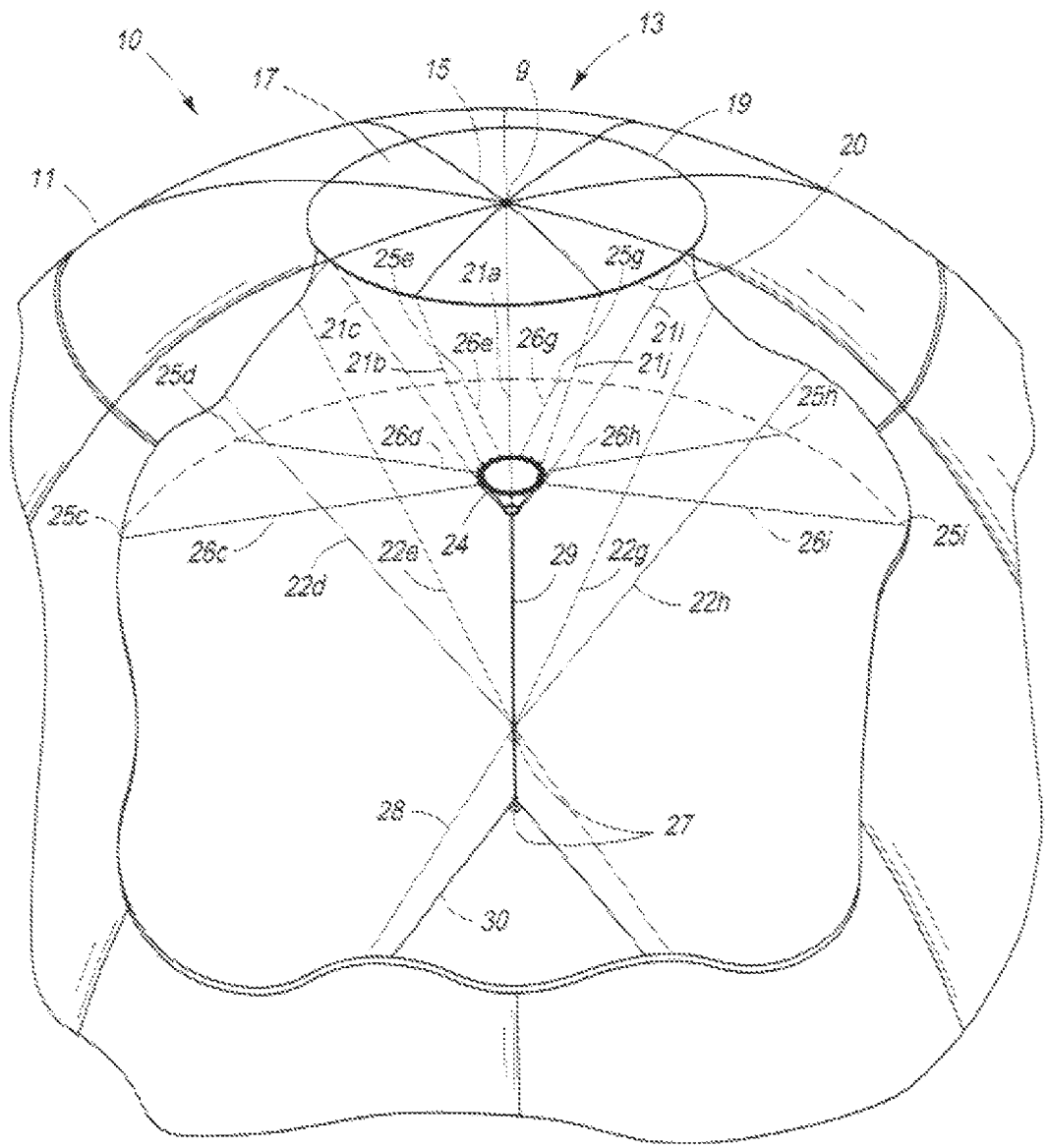
FIG. 3 is a detailed cutaway view of the hot air balloon envelope incorporating the venting design of the present invention with the vent in the closed position.
Figure 4:
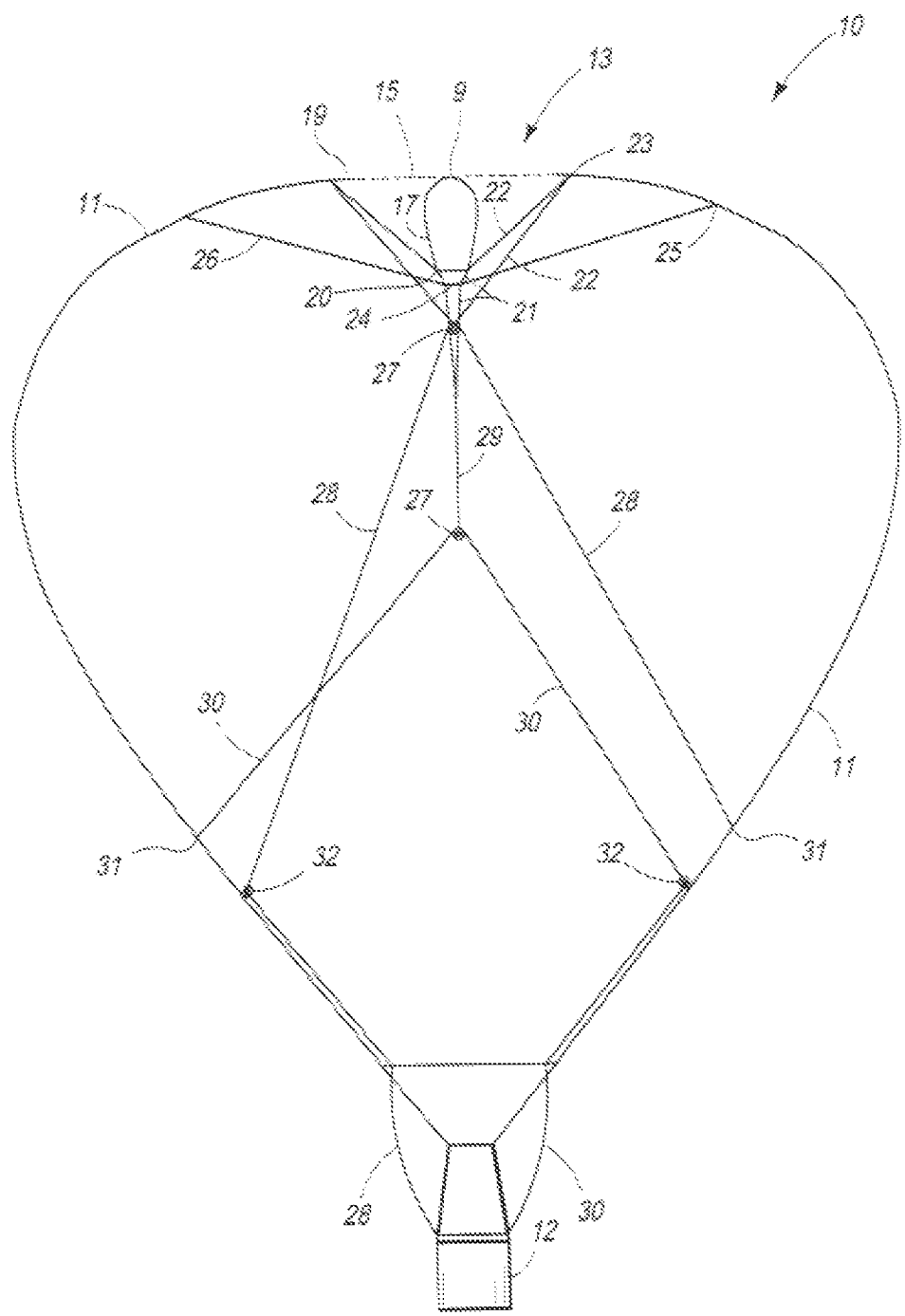
FIG. 4 is a cross-section view of the hot air balloon envelope incorporating the venting design of the present invention with the vent in the open position.
Figure 5:
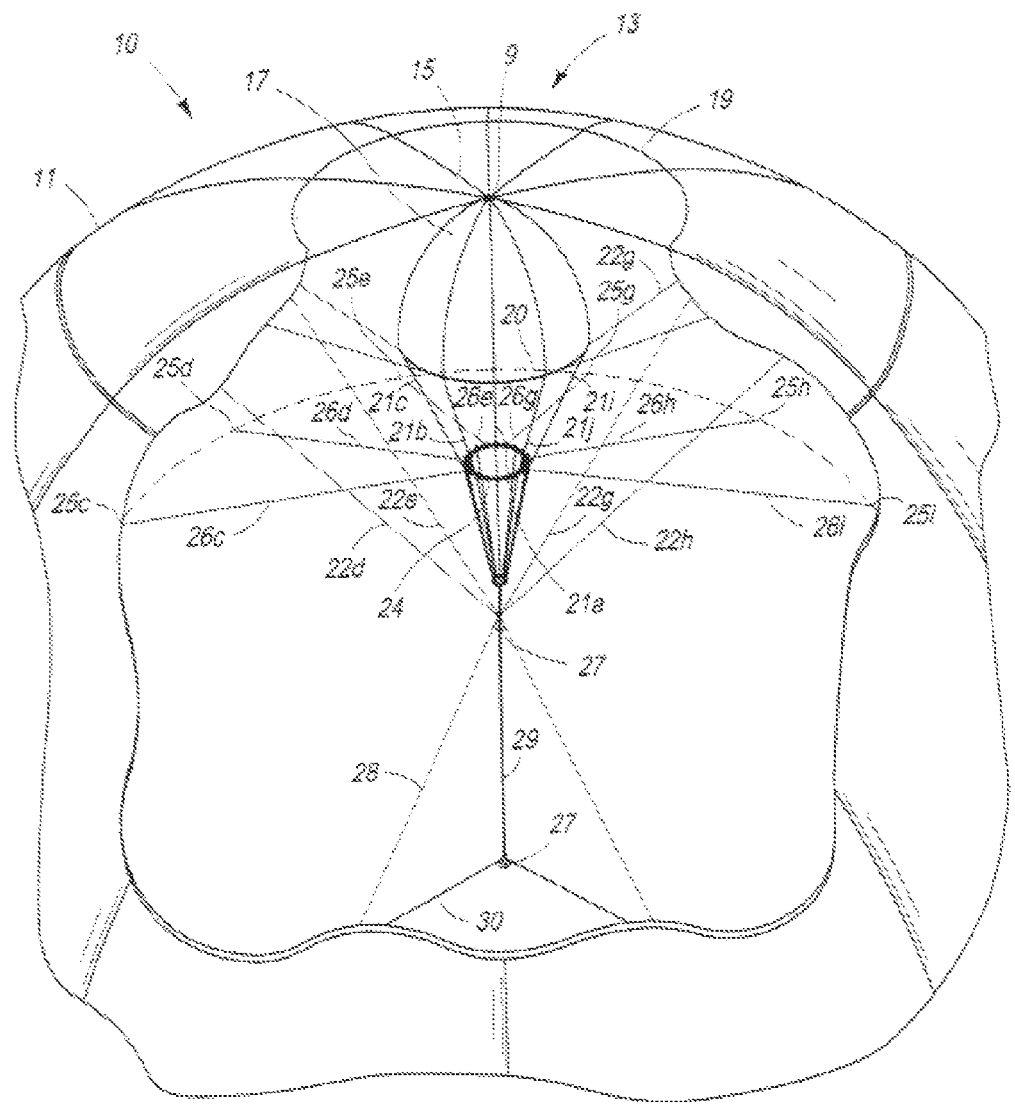
FIG. 5 is a detailed cutaway view of the hot air balloon envelope incorporating the venting design of the present invention with the vent in the open position.
Figure 6:
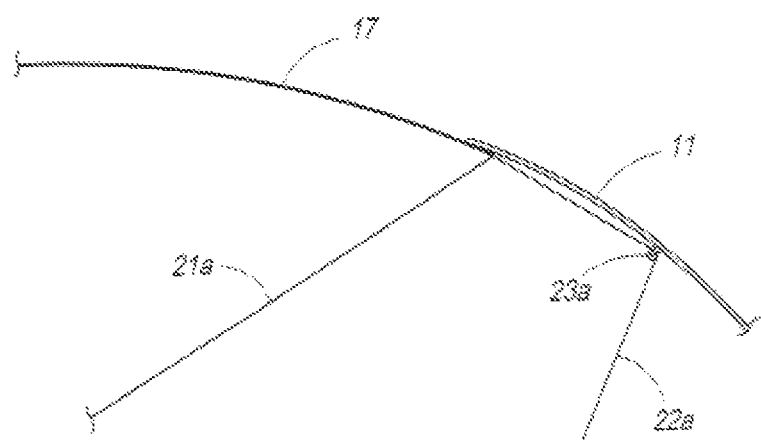
FIG. 6 is an enlarged cross-section of the upper envelope venting system showing the vent in the closed position.
Figure 7A:
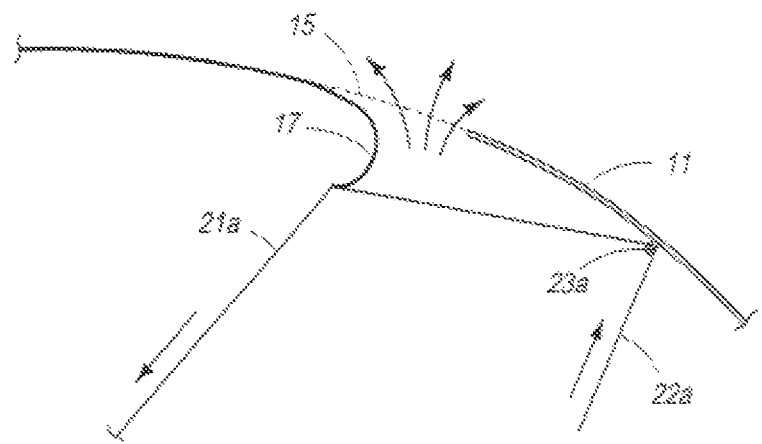
FIG. 7A is an enlarged cross-section of the upper envelope deflation system showing the deflation valve in a peel away venting position with a downward exerting force on the deflation shroud line allowing air to be vented.
Figure 7B:
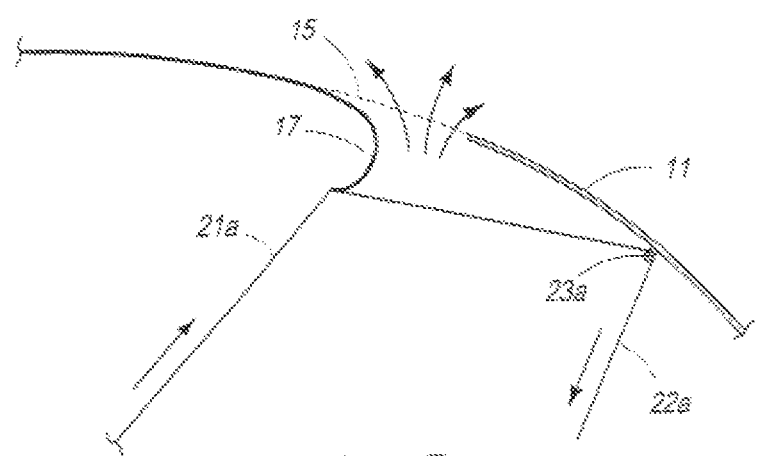
FIG. 7B is an enlarged cross-section of the upper envelope deflation system showing the deflation valve in a peel away venting position. The downward force on the reseal shroud line exerts an up and outward force on the deflation valve's outer edges starting the resealing of the deflation valve back into the deflation port opening.
Figure 8A:
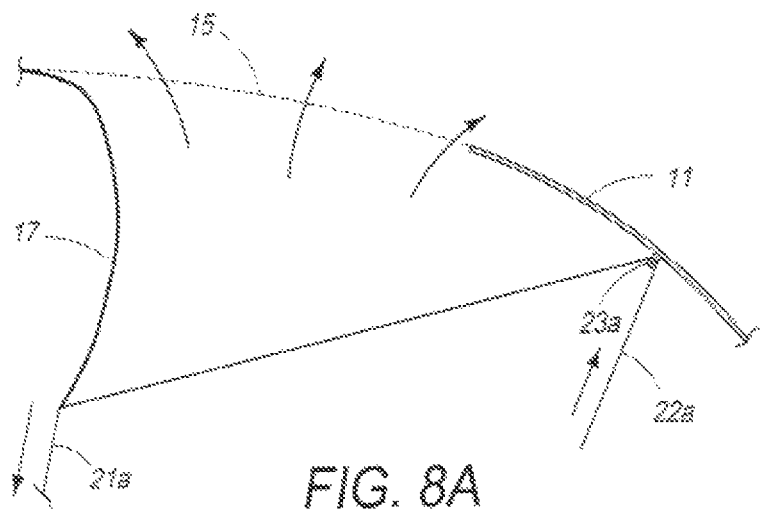
FIG. 8A, is an enlarged cross-section of the upper envelope deflation system showing the deflation valve in the open position with the force on the deflation shroud line in the downward direction to hold the deflation valve open.
Figure 8B:
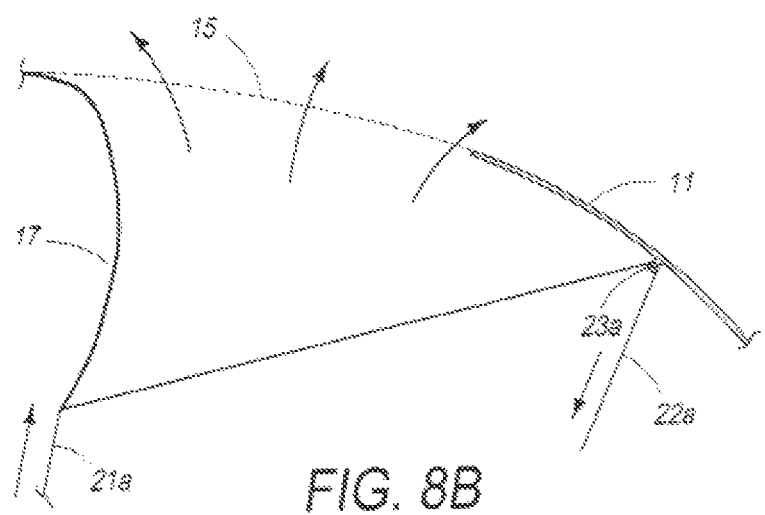
FIG. 8B is an enlarged cross-section of the upper envelope deflation system showing the deflation valve in the open position. The downward force on the reseal shroud line exerts an up and outward force on the deflation valve's outer edges starting the resealing of the deflation valve back into the deflation port opening.
Figure 9:
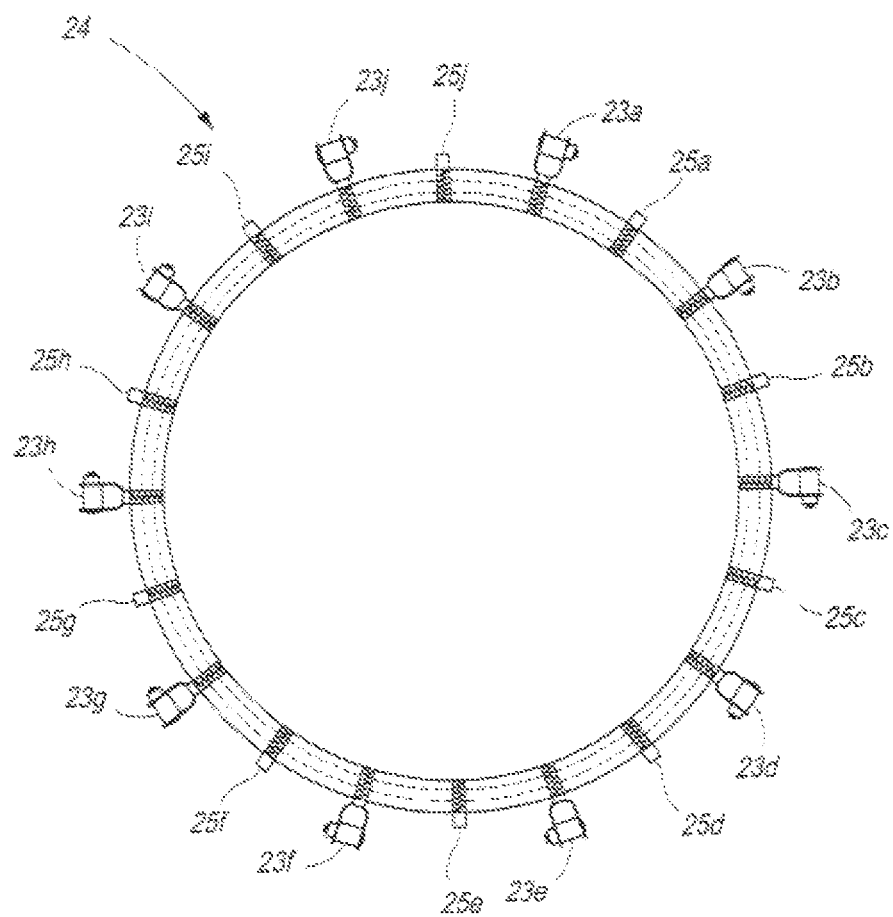
FIG. 9 illustrates the Center shroud load assembly.

FIG. 2 illustrates a balloon 10 of the invention comprising an envelope 11 and a basket 12 supported therefrom with an adjustable deflation port 13. A deflation valve 17 is mounted in the upper end of the balloon. FIG. 2 shows the deflation valve 17 closed. The deflation port system comprises a deflation valve 17 which has its center 9 connected to the center point of the apex webbing 15 in the vent opening. The connection of the deflation valve 17 to the apex webbing 15 results in that the deflation valve 17 is not free floating. The deflation valve 17 is connected to two pluralities of shroud lines. One plurality of shroud lines are short and are deflation shroud lines 21a-21j which descend down to a shroud load assembly 24 shown in detail in FIG. 9 located directly below the deflation valve 17. The shroud load assembly 24 is a fabric disk with a plurality of pulleys 23a-23j as shown in FIG. 9. Attachment points 25a-25j are sewn around its perimeter between pulleys 23a-23j. The pulleys 23 and attachment points 25 generally correspond to the number of gores in the envelope. A plurality of centering lines 26a-26j are attached to the shroud load assembly 24 and to the inside gore seams 25 so as to suspend the shroud load assembly 24 in the center of the envelope directly below the deflation valve. The deflation valve shroud lines 21a-21j run through pulleys 23a-23j on the shroud load assembly 24 and are joined together. A jumper line 29 is attached to the shroud line 21a-21j and has pulley 27 at its lower end extending toward the basket. A deflation line 30 runs through pulley 27 and one end of line 30 is attached to a bridle assembly 31 located near the mouth of the envelope. The other end of the deflation line 30 goes through the bridle pulley assembly 32 located on the opposite side of the envelope and extends down to the basket 12 where it is attached at a suitable location so that wherein it can be easily reached by the pilot of the balloon for operation.

The second plurality of shroud lines, are called the resealing shrouds, 22a-22j extend from the deflation valve's outer edges down inside the envelope 11 to pulleys 23a-23j sewn to each gore seam. (See FIGS. 6, 7A, 7B, 8 & 8A) The lines 22 pass through the pulleys 23 and descend downward and are joined together just above pulley 27 mounted on the jumper rope 29. A second pulley 27 is attached to the shroud group. A resealing line 28 runs through pulley 27 and one is end attached to a bridle assembly 31 located up from the mouth of the envelope. The other end to resealing line 28 goes down the opposite side of the envelope and runs through a bridle pulley assembly 32 and continues down the envelope into the basket 12 where it is tied off at a second suitable location wherein it can be easily reached by the pilot of the balloon.

The deflation port operates in the following manner. The pilot pulls down on the deflation line 30 which causes the plurality of shroud lines 21 to pull the deflation valve's 17 outer edge down to peel it away from the apex webbing 15 and deflation port 13 which releases air through the deflation port of the envelope 11. (See FIGS. 4, 5, 7A, 7B, 8A & 8B) Both plurality of shroud lines are attached to the deflation valve's outer edges, when the deflation valve 17 is peeled away and pulled down. The resealing lines 22 along with the resealing line 28 are pulled up into the envelope. (See FIGS. 3, 5, 6, 7A & 8A) To reseal the deflation valve 17 back into the deflation port opening 13, the pilot releases deflation line 30 and pulls down on the resealing line 28. Pulling down on the resealing line 28 reverses the deflation process by pulling deflation line 30, shroud lines 21 and deflation valve 17 up. This repositions the deflation valve 17 back against the apex webbing 15 where the internal air pressure seals it into the deflation port opening 13. (See FIGS. 7B & 8B)

Thus, it is seen that the present invention provides novel deflation and venting of the envelope through the valve which when activated is peeled away from the deflation port opening. This peeling action changes the valve's shape from a flat disk to a shape more like a jelly fish. This peeling action and the changing of its shape lowers the amount of force placed upon the valve by the balloon envelope's internal air pressure allowing the valve to be operated much easier than prior art parachute deflation systems. The present invention can be selectively operated so as to either open or close or hold in intermediate positions as desired.

Although the invention has been described with respect to preferred embodiments, it is not to be limited as changes and modifications may be made therein which are within the full intended scope as defined by the appended claims.

LEGEND FOR FIGS. 1 THRU 9—PAGES 1/9 THRU 9/9

9.—Location where Deflation Valve is attached to center point of Apex Webbing
10.—Balloon
11.—Envelope
12.—Basket
13.—Deflation port
14.—Parachute
15.—Apex Webbing
16.—Parachute attachment point prior art
17.—Deflation Valve
18.—Parachute Centering Line
19.—Deflation Port Edge
20.—Edge of the Deflation Valve
21a thru 21j.—Deflation Shroud Line
22a thru 22j.—Reseating Shroud Line
23a thru 23j.—Shroud Pulley
24.—Shroud Load Assembly
25a thru 25j—Load Assembly Line Attachment Points
26a thru 26j—Load Assembly Centering Line
27.—Deflation Line Pulley
28.—Reseating Line
29.—Jumper Line
30.—Deflation Line
31.—Bridle Assembly
32.—Bridle Pulley Assembly.

I claim as my invention:

1. A balloon comprising:
   a deflation valve having an edge, the deflation valve arranged in a deflation port of the balloon, the deflation port having gore webbing extending through the deflation port, and a central portion of the deflation valve is attached to the gore webbing extending through the deflation port,
   one or more deflation shroud lines arranged to peel the edge of the deflation valve from a closed position to an open position,
   one or more resealing shroud lines arranged to displace the edge of the deflation valve from the open position to the closed position to reseal the edge of the deflation valve to the deflation port to contain air in the balloon,
   wherein when in the closed position the edge of the deflation valve is arranged adjacent to an edge of the deflation port to contain air in the balloon, and when in the open position the edge of the deflation valve is arranged away from the edge of the deflation port and below the central portion of the deflation valve attached to the gore webbing extending through the deflation port to vent air out through the deflation port.

2. The balloon according to claim 1, wherein the deflation shroud lines are attached to the edge of the deflation valve to peel the edge of the deflation valve from the closed position to the open position.

3. The balloon according to claim 2, wherein the deflation shroud lines pass through a disk arranged a distance below the deflation valve.

4. The balloon according to claim 3, further comprising at least one line connected to the disk and to an inside of the balloon.

5. The balloon according to claim 3, further comprising a deflation line attached to the deflation shroud lines proximate to the disk and extendable to a user arranged below the balloon, wherein when the user displaces the deflation line the deflation line displaces the deflation shroud lines to peel the edge of the deflation valve from the closed position to the open position.

6. The balloon according to claim 1, wherein the resealing shroud lines are attached to the edge of the deflation valve to displace the edge of the deflation valve from the open position to the closed position to reseal the edge of the deflation valve to the deflation port to contain air in the balloon.

7. The balloon according to claim 6, further comprising a plurality of guides coupled to an inside surface of the balloon, the plurality of guides located a distance from the deflation port, and wherein the resealing shroud lines pass through the plurality of guides.

8. The balloon according to claim 7, further comprising a resealing line attached to the resealing shroud lines and extendable to a user arranged below the balloon, wherein when the user displaces the resealing line the resealing line displaces the resealing shroud lines to displace the edge of the deflation valve from the open position to the closed position to reseal the edge of the deflation valve to the deflation port to contain air in the balloon.

9. A balloon comprising:
   a deflation port having a perimeter defining an inside edge of the deflation port;
   webbing extending through the deflation port;
   a valve arranged below the deflation port, the valve having a perimeter defining an outside edge of the valve, wherein a central portion of the valve is attached to the webbing extending through the deflation port;
   a load assembly arranged below the central portion of the valve attached to the webbing;
   a plurality of deflation shroud lines displaceably guided through the load assembly and fixed to the outside edge of the valve, the plurality of deflation shroud lines to displace the outside edge of the valve down away from the central portion of the valve attached to the webbing and towards the load assembly when the plurality of deflation shroud lines are displaceably guided through the load assembly; and
   a plurality of resealing shroud lines fixed to the outside edge of the valve and displaceably guided through guides coupled to an inside surface of the balloon, the plurality of resealing shroud lines to displace the outside edge of the valve up toward the inside edge of the deflation port when the plurality of resealing shroud lines are displaceably guided through the guides coupled to the inside surface of the balloon.

10. The balloon according to claim 9, wherein when the plurality of deflation shroud lines are displaceably guided through the load assembly, the outside edge of the valve is displaced from a first position where the outside edge of the valve is adjacent to the inside edge of the deflation port to a second position where the outside edge of the valve is peeled down toward the load assembly.

11. The balloon according to claim 10,
   wherein when the plurality of resealing shroud lines are displaceably guided through the guides, the outside edge of the valve is displaced from the second position where the outside edge of the valve is peeled down toward the load assembly to the first position where the outside edge of the valve is adjacent to the inside edge of the deflation port.

12. The balloon according to claim 9, further comprising a basket arranged below the valve for carrying at least one user.

13. A deflation valve arrangeable in a deflation port of a balloon, the deflation valve comprising:
- an edge and a central portion, the central portion of the deflation valve attachable to apex webbing extending through the deflation port,
- one or more deflation shroud lines arranged to peel the edge of the deflation valve from a closed position to an open position,
- one or more resealing shroud lines arranged to displace the edge of the deflation valve from the open position to the closed position to reseal the edge of the deflation valve to the deflation port to contain air in the balloon,
- wherein when in the closed position the edge of the deflation valve is arranged adjacent to an edge of the deflation port to contain air in the balloon, and when in the open position the edge of the deflation valve is arranged away from the edge of the deflation port and below the central portion of the deflation valve attached to the apex webbing extending through the deflation port to vent air out through the deflation port.

* * * * *